Figure 1:
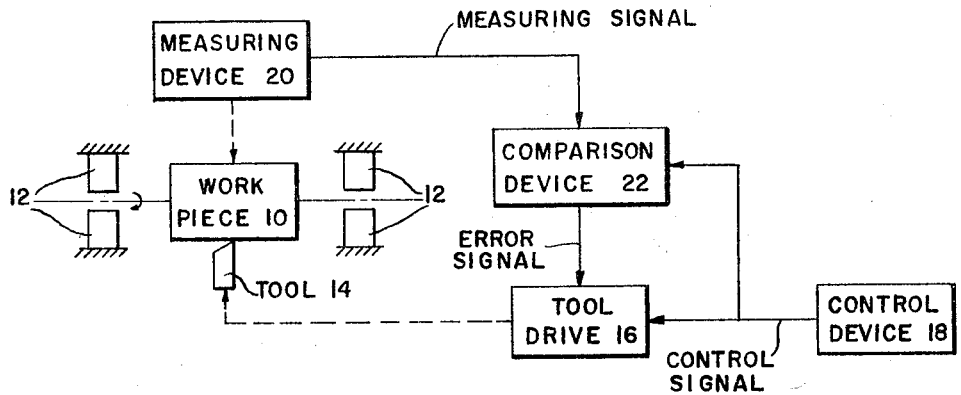

INVENTOR
Franz Lothmann
BY Spencer & Kaye
ATTORNEYS

United States Patent Office 3,269,233
Patented August 30, 1966

3,269,233
CONTROL ARRANGEMENT AND METHOD
Franz Lothmann, Stutgerloch, near Langerwehe, Rhineland, Germany, assignor to O. Dörries A.G., Duren, Germany
Filed May 19, 1964, Ser. No. 368,602
Claims priority, application Germany, May 22, 1963, D 41,613
3 Claims. (Cl. 82—14)

The present invention relates to a mechanical system by means of which machine tools and the like can be positioned.

There exist various systems for operating automatic machine tools in response to a numerical program which can be stored on intelligence carriers such as punch cards, magnetic tape or punched tape. Systems of this type generally incorporate a servo system which operates, essentially as follows: A signal is derived from a program read-out device through which is passed the intelligence carrier, i.e., the punched or magnetic tape or the like. This read-out device thus serves as a control device which puts out signals, usually in digital form, that represent the positions which the actual work tool of the machine is to occupy in order to carry out a certain task. In practice, the machine tool may be a milling machine, a drill, a lathe or any other power-driven machine tool. The electrical signal put out by the control device is amplified and applied to the tool drive, the latter being part of a servo system which causes the drive to assume the position dictated by the signals put out by the control device. The movable component carrying the work tool proper is mechanically coupled to the tool drive, and the position of this movable component is measured electrically. The output from this measuring device is then compared to the control signal put out by the control device. If the two signals are equal to each other, this indicates that the movable component is being moved accurately in response to the program. If, however, there is a difference between the control signal and the measuring signal, an error signal is produced which represents the amount by which the tool drive has not moved the movable machine component to its intended position. This error signal is then re-introduced into the servo system in order to bring the tool into the proper position.

Experience has shown that the means for measuring the movement of the movable component does not accurately represent the cut produced by the work tool. For practical reasons, the movement of the movable component can not be measured directly at the cutting edge of the tool, so that there are many sources of possible error which come into play. For example, if the machine tool is a turret lathe, different errors will arise depending on which one of the tools has been moved to its operating position. Furthermore, the tool as well as the tool holder may undergo elastic deformations, to say nothing of errors which arise due to wear of the tool proper.

In view of the above, it has been found necessary frequently to interrupt the operation of the machine tool, to measure the work piece, and then to re-work it to correct any errors. This problem is particularly serious if very close tolerances have to be followed. Under such circumstances it is often necessary to re-adjust the servo loop and this, in turn, often makes it necessary to provide new intelligence carriers which will enable the machine tool to do the necessary. This, in turn, brings with it the difficulty that the new intelligence carrier will often have to be made at a place other than the workshop in which the machine tool itself is located. This, it will be appreciated, involves tremendous waste of time.

Even if the machine tool is provided with means which allow the necessary adjustments to be made on the spot, for example, by re-plugging a crossbar distributor or by re-setting potentiometers, the original values taken from the working drawings are lost.

It is, therefore, an object of the present invention to provide a method and apparatus which overcomes the above drawbacks, namely, to provide a way in which the necessary corrections can be made without it being necessary to change the programmed information.

With the above object in view, the present invention resides in a method of numerically controlling a machine tool in which a work tool works a work piece, which method comprises the steps of moving a work tool in accordance with a given program, measuring the work piece by the tool, comparing the measured value of the work piece with the programmed value for producing an error signal in the event of difference between these two values, and modifying the movement of the work tool, under the influence of the given program, in accordance with the error signal.

An apparatus capable of carrying out the above involves a numerical control arrangement which comprises means for holding a work piece, a work tool for working the work piece, a tool drive connected to the work tool, a program-responsive control device connected to the tool drive, a measuring device for measuring the work piece being worked by the work tool, and comparison means connected to receive the output of the control device and the output of the measuring device for comparing the same. The comparison means have an output whereat there appears an error signal representing the difference between the measured and programmed values of the work piece, the output of the comparison means being connected to correct the movement of the work tool.

Figure 2:
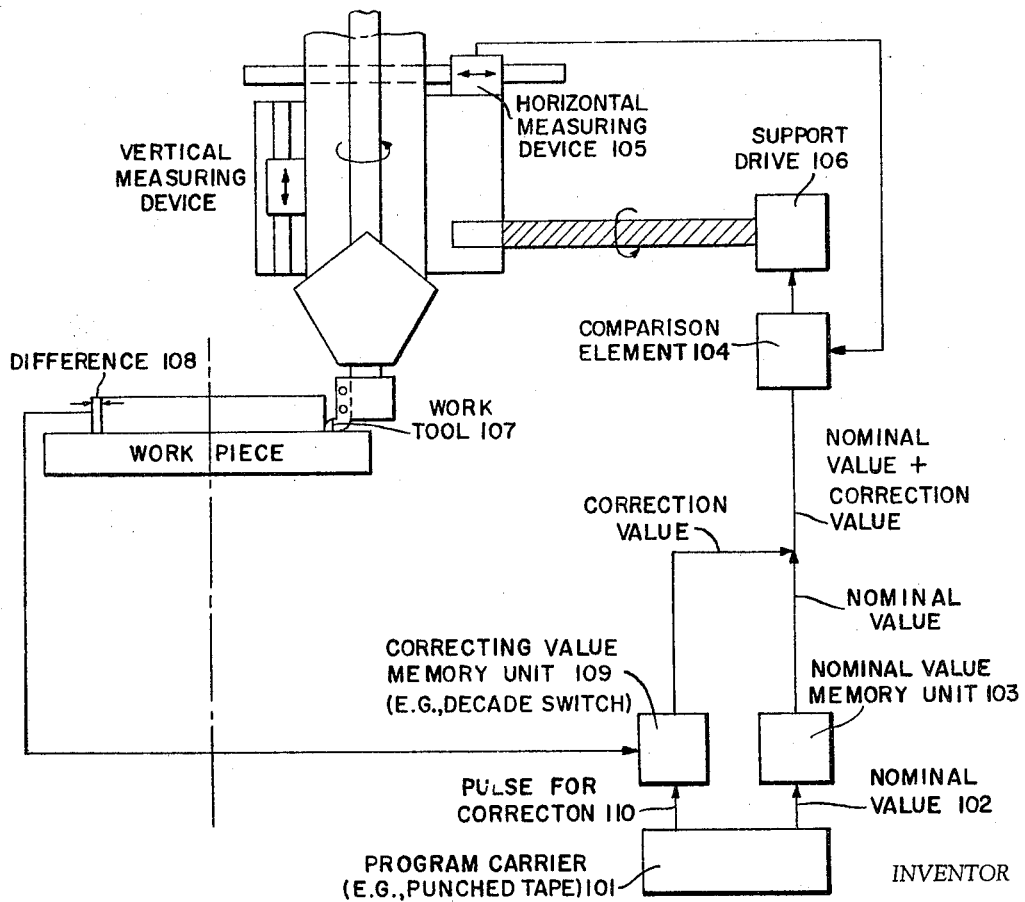

Additional objects and advantages of the present invention will become apparent upon consideration of the following description when taken in conjunction with the accompanying drawing, in which FIGURES 1 and 2 each shows a schematic diagram of a control arrangement according to the present invention.

Referring now to the drawing, FIGURE 1 shows the present invention as being incorporated in a lathe in which a work piece 10 is rotatably supported on supports 12 of the machine tool. The work piece is rotated in conventional manner. The work piece is subjected to the action of a tool 14 which may be a bit, the latter being part of the movable component of the machine tool. The tool 14 is mechanically connected to a tool drive 16 which itself is controlled by the control signal put out by a program-responsive control device 18 which may be a read-out device for reading out intelligence carried by punch cards, punched tape or magnetic tape. In practice, the control signal will be constituted by a binary number having the requisite number of digits.

According to the present invention a measuring device 20 is provided which itself is independent of the tool drive in that the measuring device does not measure the position of the movable component of the machine tool but measures the work piece 10 directly. For example, in the illustrated embodiment the measuring device 20 may measure the diameter of the section of the work piece 10 which is being cut by the tool 14. The output of measuring device 20 is a measuring signal and both this measuring signal and the control signal put out by control device 18 are applied to a comparison device 22 which may, for example, be a decade switch. The comparison device 22 has an output whereat there appears an error signal which represents the difference between the measured and programmed values of the work piece. That is to say, if the particular portion of the work piece 10 being worked by the tool 14 is, under the influence of the program, to have a given diameter and if the measuring device 20 measures precisely this diameter, the error signal will be 0. If the measured diameter is greater or smaller than the programmed diameter, the error signal will be positive or negative, as the case may be.

This error signal is connected to correct the movement of the work tool; this means that the output of the comparison device 22 is applied as a difference value which is added, algebraically, to the output of the control device, or the output of the control device may be applied to the tool drive 16 in place of the output of the control device 18.

It will be appreciated that the present invention is not limited to the use of a single measuring device 20 which measures the work piece directly. Instead, there can be a plurality of measuring devices, depending on the number of machine settings controlled by the program.

Thanks to the present invention, the programmed values will at all times remain available and can always be referred to whenever desired. Also, the arrangement is suited for controlling the path of the tool, by switching suitable control elements, under the influence of the measuring means rather than under the influence of the control device.

In the embodiment shown in FIGURE 2, the programmed nominal value 102, derived from a program carrier 101, as, for example, punched tape, is applied via a nominal value membory unit 103 to a comparison element 104. The latter also has applied to it the signal put out from a measuring device, e.g., the horizontal measuring device 105. When the measured and nominal values correspond to each other, a command signal is applied to a support drive 106, as a result of which the movement of the work tool 107 is stopped.

The work piece which has now been worked is measured in any suitable manner, e.g., by hand, by mechanical means, by electrical means, by optical means or the like, and the measurement thus taken off the work piece is compared with the desired work piece size, here the diameter. The difference 108 which is thus obtained is stored, as a correcting value, in a decade switch 109. The working of the work piece is now completed by repeating the above operation. Now, however, the punched tape 101 will also put out a pulse 110 which calls for a correction, and this pulse causes the value stored by the decade switch 109 to be put out and applied, together with the nominal value 102, to the comparison element 104. The correction value and the nominal value are thus added together. The work piece will then be considered finished when its final size corresponds to a dimension represented by the sum of the nominal value and the correction value.

It will be understood that the above description of the present invention is susceptible to various modifications, changes, and adaptations, and the same are intended to be comprehended within the meaning and range of equivalents of the appended claims.

What is claimed is:

1. A numerical control arrangement for a machine tool, comprising, in combination:
    (a) means for supplying a program in accordance with which a work piece is to be worked;
    (b) a work tool for working the work piece;
    (c) a movable tool support carrying said work tool;
    (d) a support drive for driving said tool support;
    (e) first measuring means for measuring the displacement of said support under the action of said support drive;
    (f) second measuring means associated with the work piece for producing a signal representing the difference between the actual value of a dimension of the work piece and the desired value of the dimension;
    (g) information storage means connected to said second measuring means and to said means for supplying a program for producing a signal representing the sum of the outputs of said second measuring means and of said means for supplying a program; and
    (h) comparison means having a first input directly connected to the output of said information storage means, a second input directly connected to the output of said first measuring means, and an output directly connected to said support drive for causing said support drive to drive said support by an amount which is proportional to the difference between the signals appearing at said two inputs.

2. An arrangement as defined in claim 1 wherein said comparison device is a decade switch.

3. An arrangement as defined in claim 1 wherein the machine tool is a lathe.

References Cited by the Examiner

UNITED STATES PATENTS 2,927,258  3/1960  Lippel.
3,016,778  1/1962  Fitzner.

FOREIGN PATENTS 802,206  10/1958  Great Britain.

WILLIAM W. DYER, JR., *Primary Examiner.*

G. A. DOST, *Assistant Examiner.*